(12) United States Patent
Lee et al.

(10) Patent No.: US 7,691,295 B2
(45) Date of Patent: *Apr. 6, 2010

(54) METAL OXIDE PASTE COMPOSITION AND METHOD OF MANUFACTURING SEMICONDUCTOR ELECTRODE USING THE SAME

(75) Inventors: Eun Sung Lee, Seoul (KR); Jung Gyu Nam, Yongin-si (KR); Won Cheol Jung, Seoul (KR); Byung Hee Sohn, Yongin-si (KR); Sang Cheol Park, Seoul (KR); Young Jun Park, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 411 days.

This patent is subject to a terminal disclaimer.

(21) Appl. No.: 11/491,605

(22) Filed: Jul. 24, 2006

(65) Prior Publication Data

US 2007/0102676 A1  May 10, 2007

(30) Foreign Application Priority Data

Nov. 7, 2005  (KR) ............... 10-2005-0106153

(51) Int. Cl.
  *H01B 1/20* (2006.01)
  *H01B 1/08* (2006.01)
(52) U.S. Cl. .............. 252/519.5; 252/520.1; 252/520.2; 252/520.5; 252/521.1; 252/518.1
(58) Field of Classification Search .............. 252/519.5, 252/520.1, 520.2, 520.5, 521.1, 518.1
See application file for complete search history.

(56) References Cited

U.S. PATENT DOCUMENTS

| 4,041,436 | A | * | 8/1977 | Kouchich et al. ............. 338/21 |
| 4,071,468 | A | * | 1/1978 | Abel et al. ................. 516/123 |
| 4,092,266 | A | * | 5/1978 | Abel et al. ................. 516/123 |
| 4,607,121 | A | * | 8/1986 | Faggian et al. ............. 562/537 |
| 6,183,669 | B1 | * | 2/2001 | Kubota et al. ............. 156/89.16 |
| 6,793,850 | B2 | * | 9/2004 | Ichikawa et al. ............. 252/511 |
| 6,830,710 | B2 | * | 12/2004 | Bonnet et al. ............... 252/511 |
| 7,025,906 | B2 | * | 4/2006 | Shimizu et al. ............. 252/512 |
| 7,169,209 | B2 | * | 1/2007 | Nakata et al. ................. 75/255 |
| 7,169,327 | B2 | * | 1/2007 | Ito et al. ..................... 252/500 |
| 2003/0151032 | A1 | * | 8/2003 | Ito et al. ..................... 252/570 |
| 2004/0099847 | A1 | * | 5/2004 | Miura ........................ 252/500 |
| 2006/0202174 | A1 | * | 9/2006 | Barker et al. ........... 252/519.33 |
| 2007/0001608 | A1 | * | 1/2007 | Lee et al. ..................... 313/587 |
| 2007/0072969 | A1 | * | 3/2007 | Lee et al. ..................... 524/113 |
| 2007/0112101 | A1 | * | 5/2007 | Choi et al. ................... 523/442 |
| 2007/0157852 | A1 | * | 7/2007 | Lee et al. ..................... 106/278 |
| 2007/0295957 | A1 | * | 12/2007 | Lee et al. ..................... 257/40 |
| 2008/0121850 | A1 | * | 5/2008 | Ahn et al. ................. 252/520.3 |
| 2008/0261077 | A1 | * | 10/2008 | Park et al. ................... 428/702 |
| 2009/0230363 | A1 | * | 9/2009 | Lee et al. ..................... 252/512 |

FOREIGN PATENT DOCUMENTS

JP   2002-50413 A   2/2002

OTHER PUBLICATIONS

Reg. No. 38142-12-0, Nov. 16, 1984.*
Reg. No. 87973-11-3, Nov. 16, 1984.*
Reg. No. 121057-09-8, Jun. 9, 1989.*

* cited by examiner

*Primary Examiner*—Douglas M C Ginty
(74) *Attorney, Agent, or Firm*—Cantor Colburn LLP

(57) ABSTRACT

Disclosed herein are a metal oxide paste composition comprising a carboxylic ester dispersant and/or a phosphate dispersant, and a method for manufacturing a semiconductor electrode for solar cells using the same. The disclosed metal oxide paste composition improves the dispersibility of metal oxide nanoparticles. Thus, if it is used to manufacture a semiconductor electrode for solar cells, it will allow the increased adsorption of a dye, thus improving the photoelectric efficiency of the resulting solar cell.

6 Claims, 7 Drawing Sheets

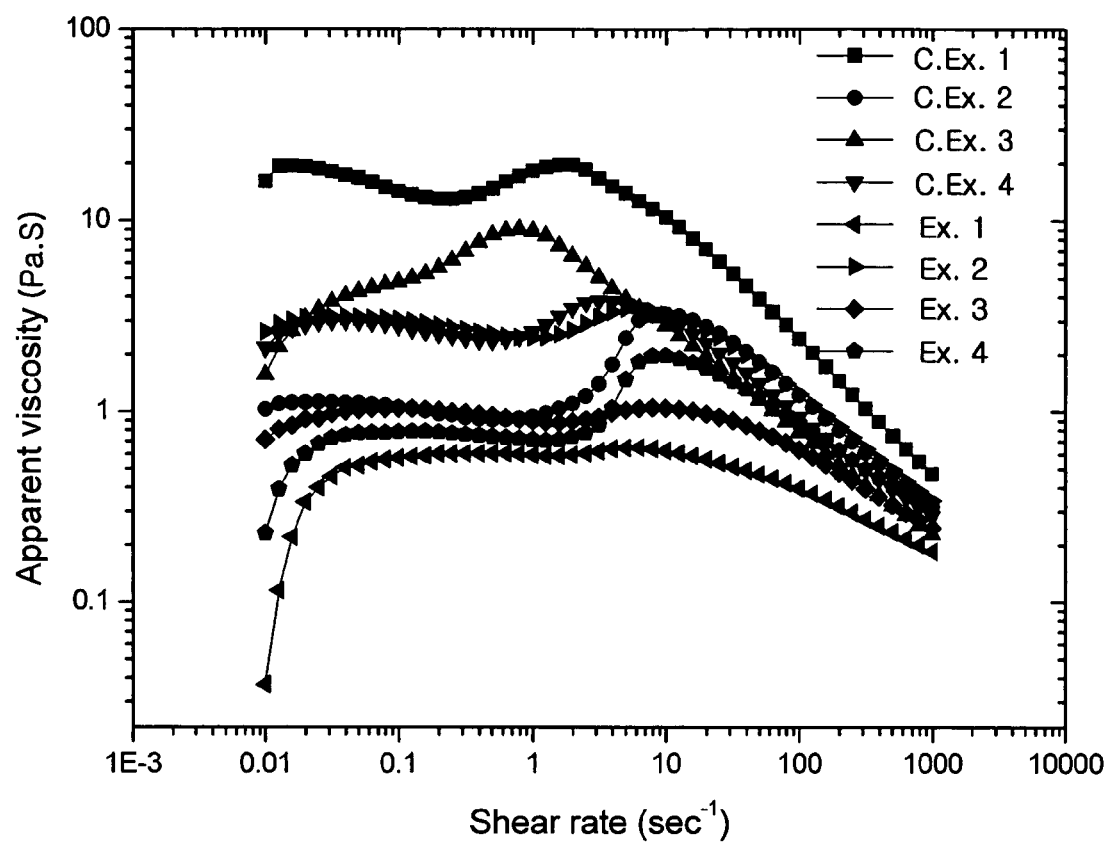

Fig. 6B
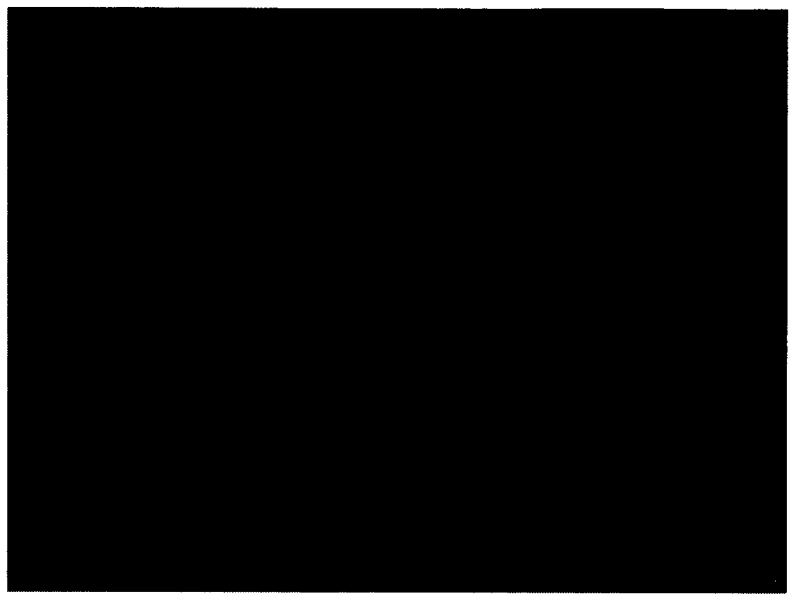
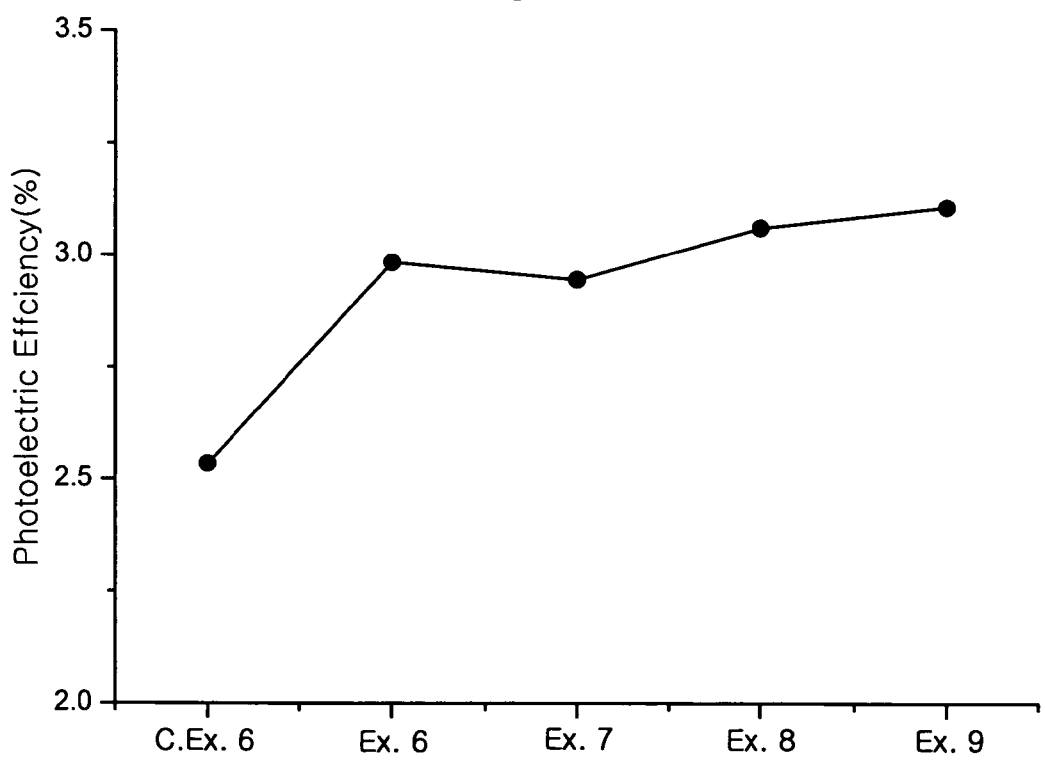
Fig. 7

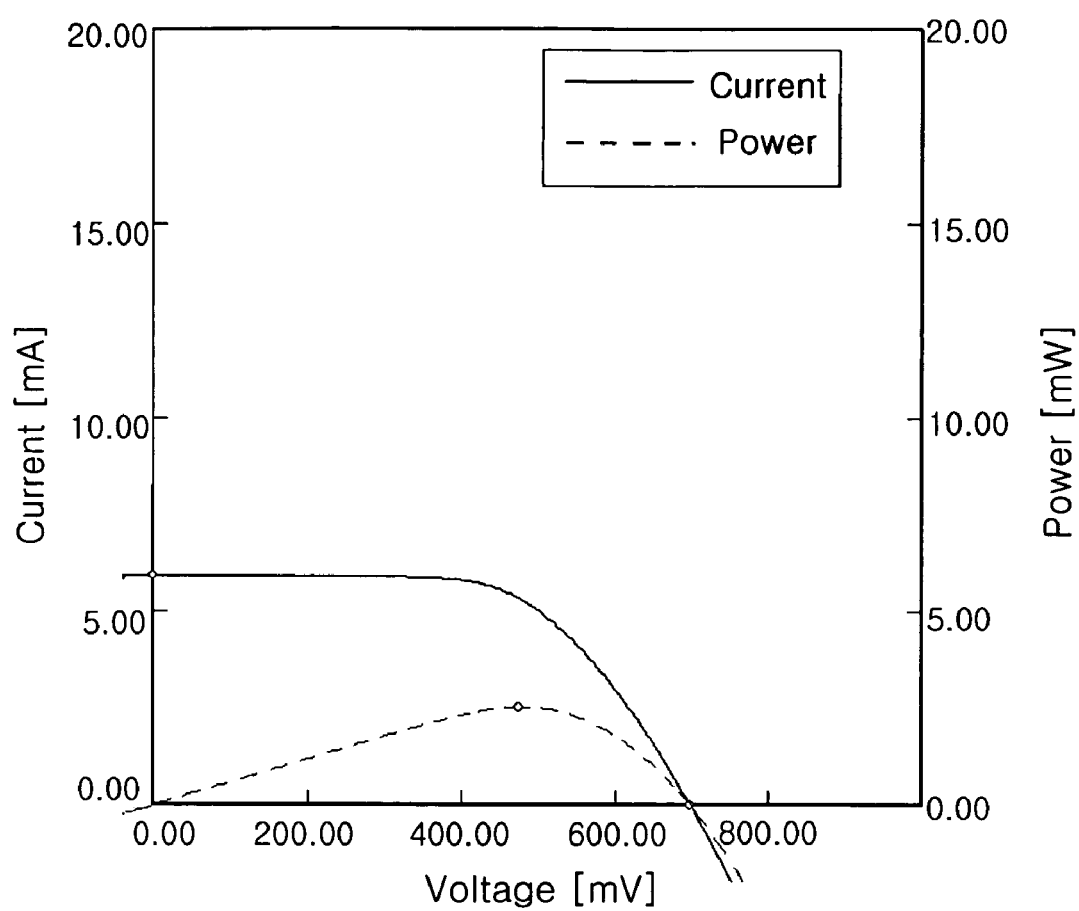

METAL OXIDE PASTE COMPOSITION AND METHOD OF MANUFACTURING SEMICONDUCTOR ELECTRODE USING THE SAME

This application claims priority to Korean Patent Application No. 2005-106153, filed on Nov. 7, 2005, and all the benefits accruing therefrom under 35 U.S.C. § 119(a), the contents of which are herein incorporated by reference in its entirety.

BACKGROUND OF THE INVENTION

1. Field of the Invention

The present invention relates to a metal oxide paste composition comprising a carboxylic ester dispersant or a phosphate dispersant, and a method for manufacturing a semiconductor electrode using the same. More particularly, it relates to a metal oxide paste composition having excellent dispersibility, which comprises a carboxylic ester dispersant or phosphate dispersant having a tail structure of hydrophilic or hydrophobic blocks, as well as a method for manufacturing a semiconductor electrode using the same.

2. Description of the Prior Art

Solar cells, which are photoelectric conversion elements that convert solar light into electricity, are sustainable and eco-friendly, unlike other energy sources, and thus are of increasing importance. In an early stage of development, monocrystalline or polycrystalline silicon solar cells were mainly used. However, silicon solar cells require large-sized expensive systems and equipment to manufacture them, are manufactured at high cost due to high raw material costs, and are limited with respect to the efficiency with which they convert solar energy into electrical energy. For this reason, a new alternative has been studied.

As an alternative to the silicon solar cells, attention is being concentrated on organic material-based solar cells that can be manufactured at low cost. Particularly, dye-sensitized solar cells having low manufacturing costs are receiving much attention.

The dye-sensitized solar cell is a photoelectrochemical solar cell comprising a semiconductor electrode having metal oxide nanoparticles adsorbed thereon, a counter-electrode, and a redox electrode disposed in the space between the two electrodes.

The photoelectric efficiency of the dye-sensitized solar cell depends on the amount of dye adsorbed on the surface of a metal oxide layer. Because the dye adsorbed on the surface of the metal oxide layer absorbs light with a high efficiency when it is present as a monomolecular layer, the absorption of solar light increases as the surface area of metal oxide having dye molecules adsorbed thereon increases. Thus, in order to obtain a high-efficiency solar cell, it is necessary to maximize the surface area of a metal oxide semiconductor film, such that it can have a maximum amount of the dye adsorbed thereon.

Accordingly, nanocrystalline materials having many anchoring sites capable of adsorbing dye particles can be used. However, because the nanocrystalline materials have high surface free energy, the metal oxide nanoparticles may show a strong tendency to cohere to each other. If the metal oxide nanoparticles cohere to each other in this way, the packing density achieved when forming the light-absorbing layer of a solar cell will be reduced, and thus the photoelectric efficiency of the resulting solar cell will also be reduced.

In an attempt to solve this problem, Japanese Patent Laid-Open Publication No. 2002-50413 discloses a technique for forming a photosemiconductor layer, comprising mixing photosemiconductor powder with a surfactant and a dispersant, such as polyethylene glycol, polyvinyl alcohol, hydroxypropyl cellulose, polyvinyl pyrrolidone or polyacrylic acid, calcining and pulverizing the mixture to prepare porous photosemiconductor particles, and mixing the prepared porous photosemiconductor particles with conventional photosemiconductor particles.

However, the dispersant disclosed in the above prior art cannot provide sufficient dispersion of the metal oxide, and thus is limited in that it cannot sufficiently improve the photoelectric efficiency of a solar cell manufactured using the same.

SUMMARY OF THE INVENTION

Accordingly, the present invention has been made to solve the above problems occurring in the prior art. An object of the present invention is thus to provide a metal oxide paste composition containing metal oxide nanoparticles having improved dispersibility.

Another object of the present invention is to provide a method for manufacturing a semiconductor electrode using said metal oxide paste composition, which allows a high-efficiency solar cell to be obtained.

To achieve the above objects, in one aspect, the present invention provides a metal oxide paste composition comprising: metal oxide; a binder solution consisting of a solvent and an organic binder; and at least one dispersant selected from carboxylic ester dispersants represented by Formulas 1 to 4, and phosphate dispersants represented by Formulas 5 to 8:

[Formula 1]

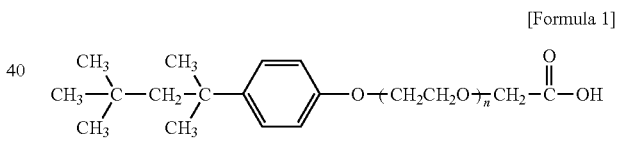

wherein n is 1-20;

[Formula 2]

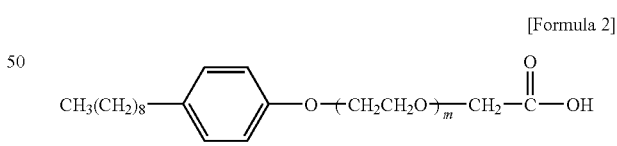

wherein m is 1-20;

[Formula 3]

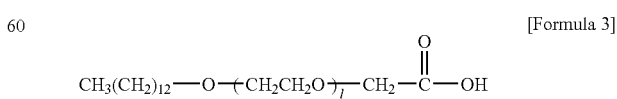

wherein l is 1-20;

[Formula 4]

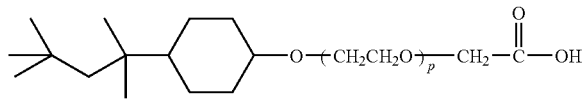

wherein p is 1-20;

[Formula 5]

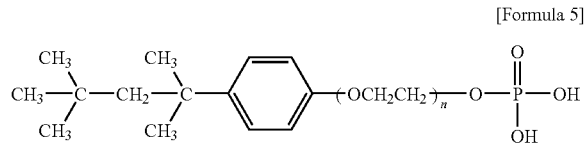

wherein n is 1-20;

[Formula 6]

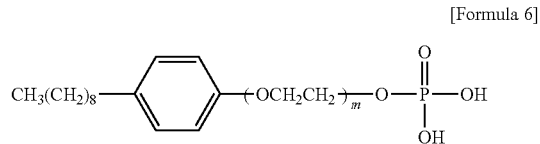

wherein m is 1-20;

[Formula 7]

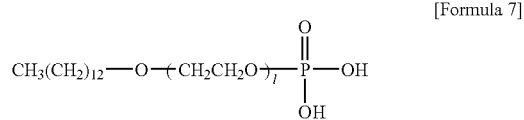

wherein l is 1-20; and

[Formula 8]

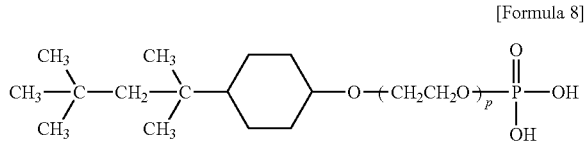

wherein p is 1-20.

In another aspect, the present invention provides a method for manufacturing a semiconductor electrode, comprising the steps of: preparing a metal oxide paste composition comprising metal oxide, an organic binder, a solvent, and at least one dispersant selected from the group consisting of carboxylic ester dispersants represented by Formulas 1 to 4 and phosphate dispersants represented by Formulas 5 to 8; and coating the metal oxide paste composition on a transparent electrode.

BRIEF DESCRIPTION OF THE DRAWINGS

The above and other objects, features and advantages of the present invention are further illustrated by the following detailed description taken in conjunction with the accompanying drawings, in which:

FIG. 4 is a graphic diagram showing the comparison of changes in viscosity as a function of shear rate between metal oxide paste compositions according to the Examples and Comparative Examples;

FIG. 6b is an optical microscope photograph of a titanium dioxide thin film formed from the metal oxide paste composition of Example 1;

FIG. 7 is a graphic diagram showing the photoelectric efficiencies of solar cells manufactured in Examples 6 to 9 and Comparative Example 6;

FIG. 8a is a photocurrent-voltage curve for the solar cell manufactured in Comparative Example 5.

DETAILED DESCRIPTION OF THE INVENTION

Figure 1:
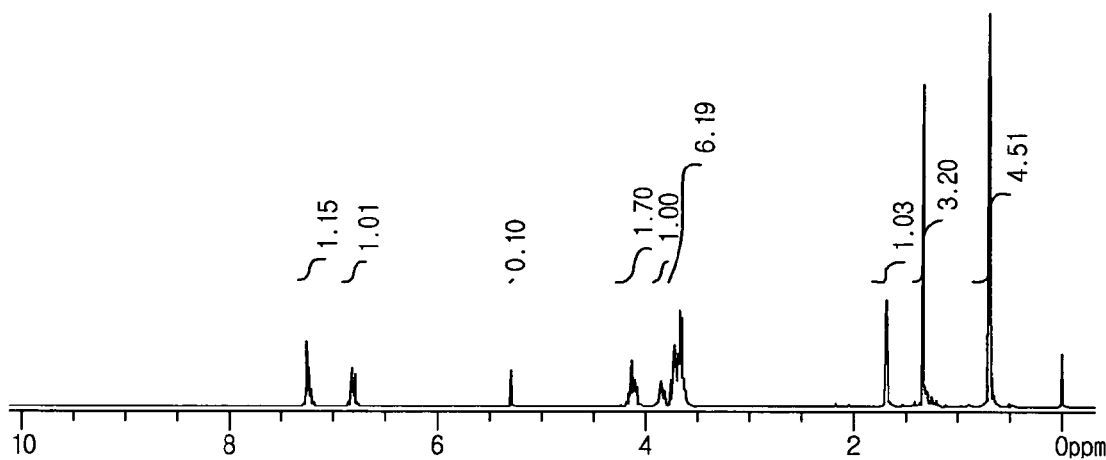
FIG. 1 is the $^1$H-NMR spectrum of a carboxylic ester dispersant synthesized in an example of the present invention.

This invention will be described in further detail with reference to the accompanying drawings.

It will be understood in the following disclosure of the present invention, that as used herein, the term "and/or" includes any and all combinations of one or more of the associated listed items. In addition, the singular forms "a", "an" and "the" are intended to include the plural forms as well, unless the context clearly indicates otherwise. It will be further understood that the terms "comprise", "comprises", and "comprising," when used in this specification, specify the presence of stated features, integers, steps, operations, elements, components, and/or combination of the foregoing, but do not preclude the presence and/or addition of one or more other features, integers, steps, operations, elements, components, groups, and/or combination of the foregoing. The use of the terms "first", "second", and the like, where included, are for purposes of distinguishing elements only, and therefore should not be considered as implying any particular order or sequence unless otherwise specified.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A metal oxide paste composition according to the present invention comprises metal oxide nanoparticles, a binder solution, and a dispersant, wherein the dispersant is at least one selected from the group consisting of carboxylic ester dispersants represented by Formulas 1 to 4 below and phosphate dispersants represented by Formulas 5 to 8 below. The dispersant which is used in the present invention is a carboxylic ester dispersant or phosphate dispersant having a tail structure in the form of hydrophilic blocks or hydrophobic blocks.

[Formula 1]

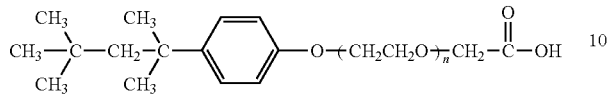

wherein n is 1-20;

[Formula 2]

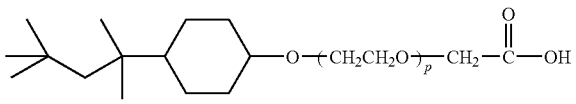

wherein m is 1-20;

[Formula 3]

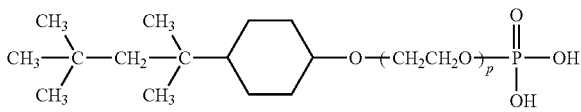

wherein l is 1-20;

[Formula 4]

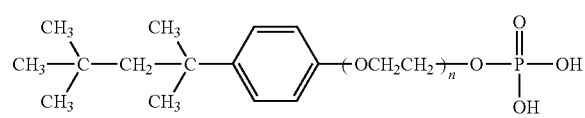

wherein p is 1-20;

[Formula 5]

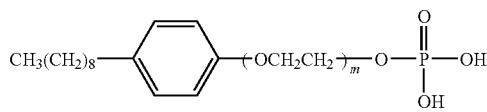

wherein n is 1-20;

[Formula 6]

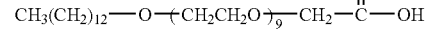

wherein m is 1-20;

[Formula 7]

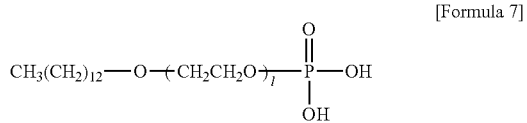

wherein l is 1-20; and

[Formula 8]

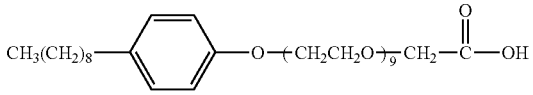

wherein p is 1-20.

The carboxylic ester dispersants or phosphate dispersants disclosed herein can improve the dispersion of the metal oxide paste and maintain the viscosity of the metal oxide paste composition constant while permitting an increased amount of metal oxide to be used.

Regarding the exact action mechanism of the dispersant as described above, it is believed that the dispersion of metal oxide nanoparticles is improved because the carboxylic group or phosphate group of the dispersant is adsorbed on the surface of metal oxide nanoparticles to reduce particle-to-particle interaction. The metal oxide paste composition prepared using these dispersants can be used to manufacture a semiconductor electrode for photoelectric conversion elements, such as a dye-sensitized solar cell.

Preferred examples of the carboxylic ester dispersants represented by Formulas 1 to 4 have structures represented by Formulas 9 to 12, respectively:

[Formula 9]

[Formula 10]

[Formula 11]

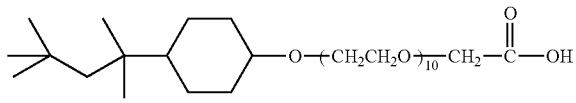
[Formula 12]

Preferred examples of the phosphate dispersants represented by Formula 5 or 6 have structures represented by Formulas 13 to 16 below:

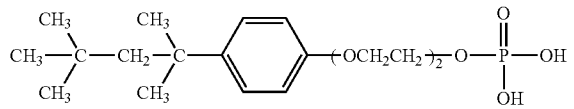
[Formula 13]

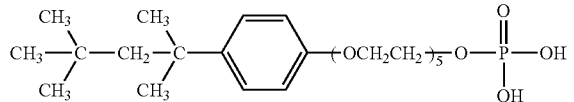
[Formula 44]

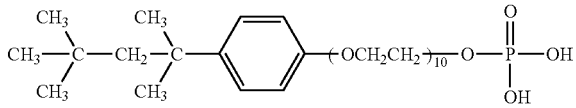
[Formula 15]

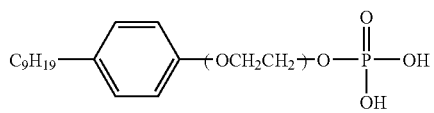
[Formula 16]

The metal oxide paste composition comprises, in addition to the dispersant, a binder solution and a metal oxide. The metal oxide, typically in the form of a powder, can be the same as or similar to metal oxides used in metal oxide paste compositions that do not include the dispersants disclosed herein.

The binder solution comprises an organic binder and a solvent. After dissolution in the solvent, the organic binder imparts viscosity to the binder solution and the metal oxide paste composition prepared therefrom, and imparts binding force after drying to a metal oxide layer that can be prepared from the metal oxide paste composition. Exemplary organic binder resins, which can be used herein include acrylic resin, styrene resin, cellulose resin, methacrylic ester polymer, styrene-acrylic ester copolymer, polyvinylbutyral, polyvinyl alcohol, polyethylene oxide, polypropylene carbonate and polymethyl methacrylate, but are not necessarily limited thereto.

Solvents useful for forming the binder solution include commercialized solvents which can be used alone or as a mixture of two or more solvents, and which are selected in consideration of the metal oxide, the organic binder and the physical properties of the metal oxide paste composition to be obtained. Solvents which can be used in the metal oxide paste composition disclosed herein are not specifically limited.

Solvents which can be used in the present invention may include: aromatic hydrocarbon compounds, such as toluene and xylene; ether compounds, such as tetrahydrofuran and 1,2-butoxyethane; ketone compounds, such as acetone and methylethylketone; ester compounds, such as ethyl acetate, butyl acetate, and butyl carbitol acetate (BCA); and alcohol compounds, such as isopropylalcohol, terpineol, diethyleneglycol monobutylether, and 2-phenoxyethanol. An example of a mixed solvent is a mixture of terpineol and butyl carbitol acetate.

The metal oxide paste composition may further comprise, in addition to the dispersant, an additive such as a plasticizer, a leveling agent, an antioxidant, a lubricating agent, an antifoamer, and the like, or a combination comprising at least one of the foregoing additives, as long as the additive or additives do not significantly adversely affect the desired physical properties of the composition.

The metal oxide paste composition comprises 10-40 wt % of the metal oxide powder, and 1-10 wt % of the carboxyl ester dispersant and/or phosphate dispersant, based on the total weight of the metal oxide powder, the carboxyl ester dispersant or phosphate dispersant, and the binder solution.

The metal oxide paste composition can be prepared by adding the dispersant to the binder solution, and then adding the metal oxide powder to the solution. For example, it can be prepared by dissolving an organic binder, such as ethyl cellulose, in a mixed solvent of butyl carbitol acetate and α-terpineol; adding other additives such as a dispersant, a defoamer and/or a leveling agent, to the solution; adding the metal oxide to the mixture; and then milling all of the combined components for the metal oxide paste composition using, for example, zirconia balls, to disperse them uniformly.

The metal oxide paste composition can be used to manufacture a semiconductor electrode for solar cells. When the metal oxide paste composition is used to form the metal oxide layer of the semiconductor electrode, it can form a uniform thin film without cohesion between the metal oxide nanoparticles. Surprisingly, the occurrence of cracks resulting from pores formed after calcination of the metal oxide layer is reduced, allowing increased adsorption of a photosensitive dye, and thus improving the photoelectric efficiency of the resulting solar cell.

Another aspect of the present invention relates to a method for manufacturing a semiconductor electrode using the above-described metal oxide paste composition. To manufacture a semiconductor electrode according to the inventive method, a metal oxide paste composition, which comprises a solvent, an organic binder, metal oxide powder, and at least one dispersant selected from the group consisting of the dispersants represented by Formulas 1 to 8, is prepared. The metal oxide paste composition can then be coated on a transparent electrode to manufacture a semiconductor electrode.

To manufacture a semiconductor electrode, a transparent electrode coated with a conductive material is prepared and a light-absorbing layer consisting of a metal oxide layer and a dye adsorbed on the surface of the metal oxide layer is then formed on one surface of the transparent electrode. In the method disclosed herein, the metal oxide layer is formed using the metal oxide paste composition having the dispersants disclosed herein, after which a dye can be adsorbed on the surface of the metal oxide according to any method known in the art to which the present invention pertains.

The semiconductor electrode has a transparent electrode formed on a substrate, in which the transparent electrode is formed by coating a conductive material on the substrate. The substrate is not specifically limited as long as it is transparent, and examples of the substrate which can be used in the present invention include transparent inorganic substrates such as quartz and glass, or transparent plastic substrates such as polyethylene terephthalate (PET), polyethylene naphathalate (PEN), polycarbonate, polystyrene, or polypropylene.

Also, the conductive material which is coated on the substrate is exemplified by indium tin oxide (ITO), gallium indium tin oxide, zinc indium tin oxide, titanium nitride, fluorine-doped tin oxide (FTO), ZnO—$Ga_2O_3$, ZnO—$Al_2O_3$, $SnO_2$—$Sb_2O_3$ and PEDOT, but is not necessarily limited thereto.

In the present invention, the metal oxide may be one or more of, for example, titanium oxide, niobium oxide, hafnium oxide, tungsten oxide, indium oxide, tin oxide and zinc oxide, and the like, but is not necessarily limited thereto. These metal oxides may be used alone or in a mixture of two or more. Specific examples of the metal oxide include $TiO_2$, $SnO_2$, ZnO, $WO_3$, $Nb_2O_5$, and $TiSrO_3$. A particularly useful example is anatase-type $TiO_2$.

The metal oxides forming the light-absorbing layer preferably have large surface area in order to enable the dye adsorbed on the surface thereof to absorb more light and to enhance the adhesion thereof to an electrolyte layer. Accordingly, the metal oxides of the light-absorbing layer preferably have nanostructures, such as quantum dots, nanodots, nanotubes, nanowires, nanobelts or nanoparticles.

Although there is no particular limitation on the particle size of the metal oxides forming the metal oxide layer, the average particle size of primary particles is 1-1000 nm, and preferably 5-400 nm. It is also possible to use a mixture of at least two metal oxides having different particle sizes to scatter incident light and increase quantum yield. In addition, the metal oxide layer may also be formed to have a two-layer structure using two kinds of metals having different particle sizes.

Although the method for forming the metal oxide layer using the metal oxide paste composition is not specifically limited, a method of forming the layer through a wet process is preferable in terms of physical properties, convenience, manufacturing costs, etc. It is desirable to use a method comprising coating the metal oxide paste composition on a substrate having a transparent conductive film formed thereon. In this case, the method for performing the coating step is not specifically limited and may be performed using, for example, spraying, spin coating, dipping, printing, doctor blading, sputtering, or electrophoresis.

The coating step is followed by drying and calcining steps, in which the drying step can be carried out at a temperature of about 50-100° C. and the calcining step at a temperature of about 400-600° C.

As the dye in the present invention, any material may be used without any particular limitation as long as it is one generally used in the solar cell field. Preferred examples of the dye are ruthenium complexes such as $RuL_2(SCN)_2$, $RuL_2(H_2O)_2$, $RuL_3$, and $RuL_2$, wherein L represents 2,2'-bipyridinyl-4,4'-dicarboxylate or the like. In addition to the ruthenium complexes, any dye may be used as long as it has a charge separation function and shows photosensitivity.

The metal oxide layer is immersed in a solution containing a photosensitive dye for at least 12 hours to adsorb the dye onto the surface of the metal oxide. The solvent for forming the photosensitive dye-containing solution is exemplified by tertiary butyl alcohol, acetonitrile, or a mixture thereof.

Figure 3A:
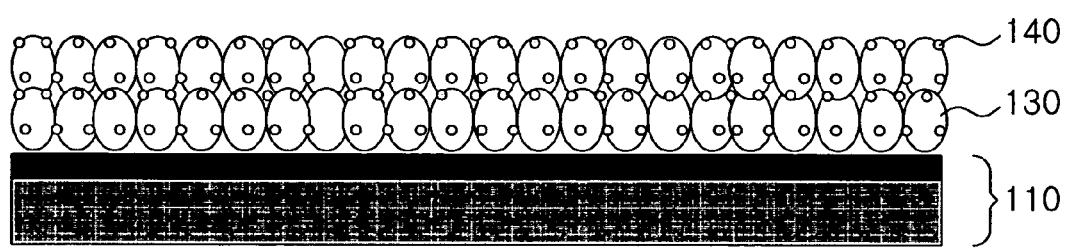
FIG. 3a is a schematic cross-sectional view showing an example of a semiconductor electrode manufactured according to the method disclosed herein.
Figure 3B:
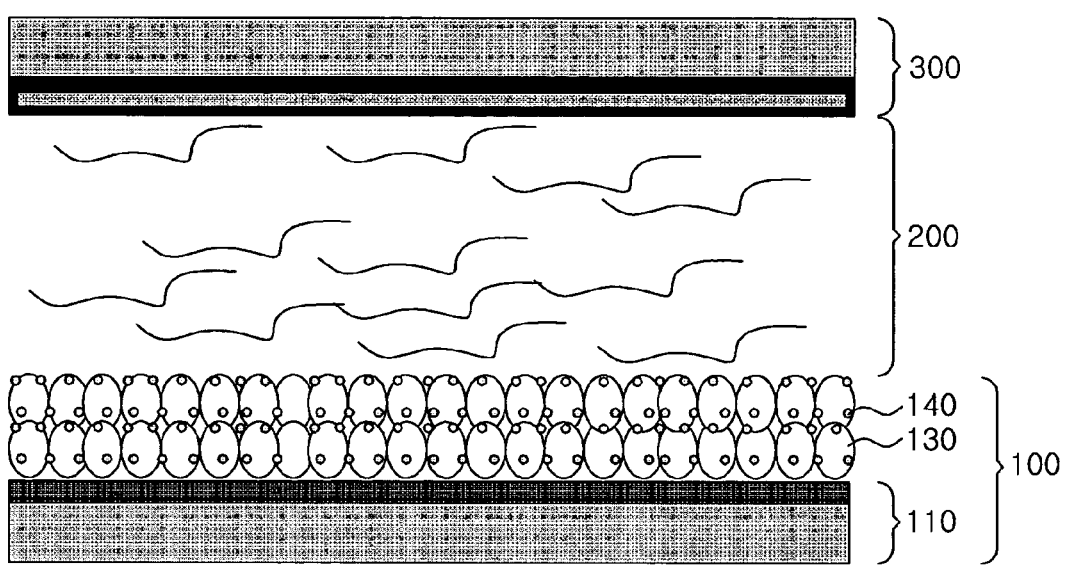
FIG. 3b is a schematic cross-sectional view showing an example of a solar cell manufactured using the semiconductor electrode disclosed herein.

FIG. 3a is a schematic cross-sectional view showing an example of a semiconductor electrode manufactured according to the inventive method. As shown in FIG. 3a, the inventive semiconductor electrode comprises: a transparent electrode 110 made of a conductive electrode coated on a substrate; a metal oxide layer 130; and a dye 140 adsorbed on the surface of the metal oxide layer. FIG. 3b is a schematic cross-sectional view showing an example of a dye-sensitized solar cell manufactured according to the inventive method. As shown in FIG. 3b, the dye-sensitized solar cell comprising a semiconductor electrode according to the present invention comprises a semiconductor electrode 100, an electrolyte layer 200, and a counter-electrode 300. The semiconductor electrode 100 consists of a transparent electrode 110 and a light-absorbing layer, in which the light-absorbing layer comprises a metal oxide layer 130 having a dye 140 adsorbed on the surface thereof.

In the solar cell that utilizes the inventive semiconductor electrode, the electrolyte layer 200 may be made of any material that has a hole transport function. Examples of a material that can be used to form the electrolyte layer in the present invention include iodine-acetonitrile solution, NMP solution, 3-methoxypropionitrile, triphenylmethane, carbazole, and N,N'-diphenyl-N,N'-bis(3-methylphenyl)-1,1'-biphenyl-4,4'-diamine (TPD).

The counter-electrode 300 is formed by uniformly coating a conductive material on the entire surface of a substrate. The counter-electrode is desirably made of an electrochemically stable material. Useful electrochemically stable materials can include, for example, platinum, gold, carbon, or carbon nanotubes.

Hereinafter, the present invention will be described in further detail with reference to the examples. It is to be understood, however, that these examples are for illustrative purposes only and are not to be construed to limit the scope of the present invention.

EXAMPLES

Synthesis of Carboxylic Ester Dispersant

A carboxylic ester dispersant represented by Formula 9 was synthesized according to Reaction Scheme 1 below:

[Reaction Scheme 1]

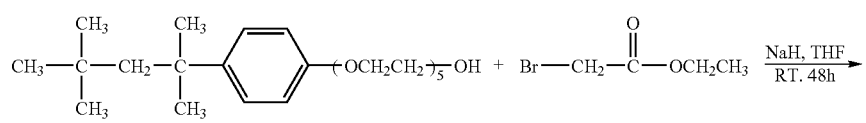

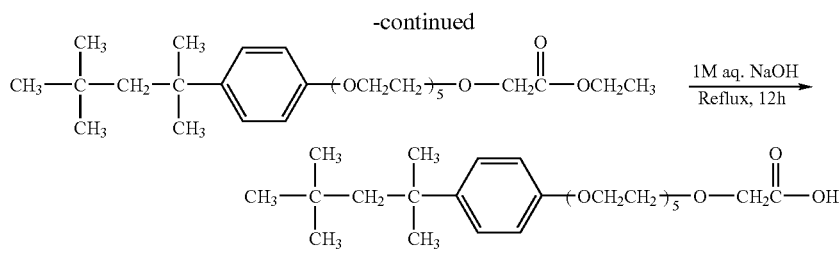

In a three-necked flask, NaH (50 mmol) was mixed with THF (50 ml) at room temperature, to which 25 mmol of Triton™ X-45 represented by Formula 17 below was then added under an argon atmosphere. The reaction mixture was stirred for 2 hours. To the stirred reaction mixture, ethyl bromoacetate (50 mmol) was added at 0° C. over 2 hours and stirred at 25° C. for 12 hours. Then, the mixture was poured into cold ice water. The organic layer was isolated and washed with aqueous hydrochloric acid solution and water. The synthesized product was added to a mixture of 1M NaOH (100 ml) and methanol (10 ml). The solution was heated to reflux for 12 hours. The resulting aqueous solution was adjusted to about pH 2 with 1N HCl and then extracted two times with $CHCl_3$ (200 ml×2). The organic layer was dried over $MgSO_4$ and the organic solvent was then removed under reduced pressure. The residue was purified by column chromatography over silica and eluted with a mixture of methylene chloride and methanol ($CH_2Cl_2$:MeOH=20:1 v/v) to obtain the carboxylic ester dispersant of Formula 5 as a yellow oil (84% yield). The 500-MHz $^1$H-NMR spectrum of the dispersant thus obtained is shown in FIG. 1.

[Formula 17]

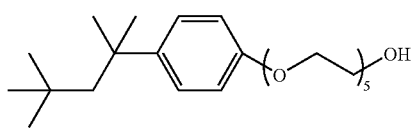

Synthesis of Phosphate Dispersant

The phosphate dispersant represented by Formula 14 was synthesized according to Reaction Scheme 2 below.

[Reaction Scheme 2]

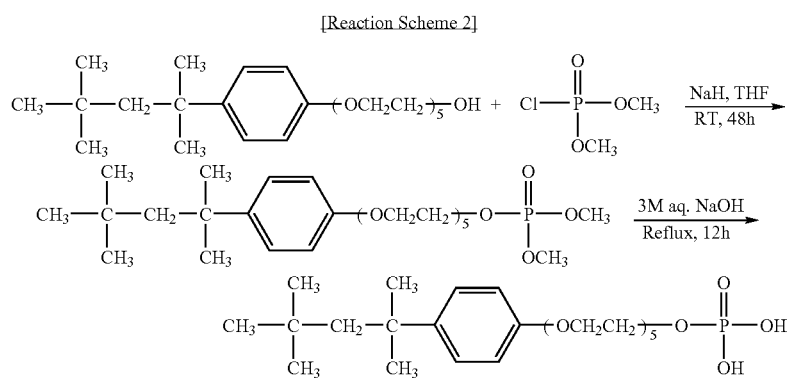

Figure 2:
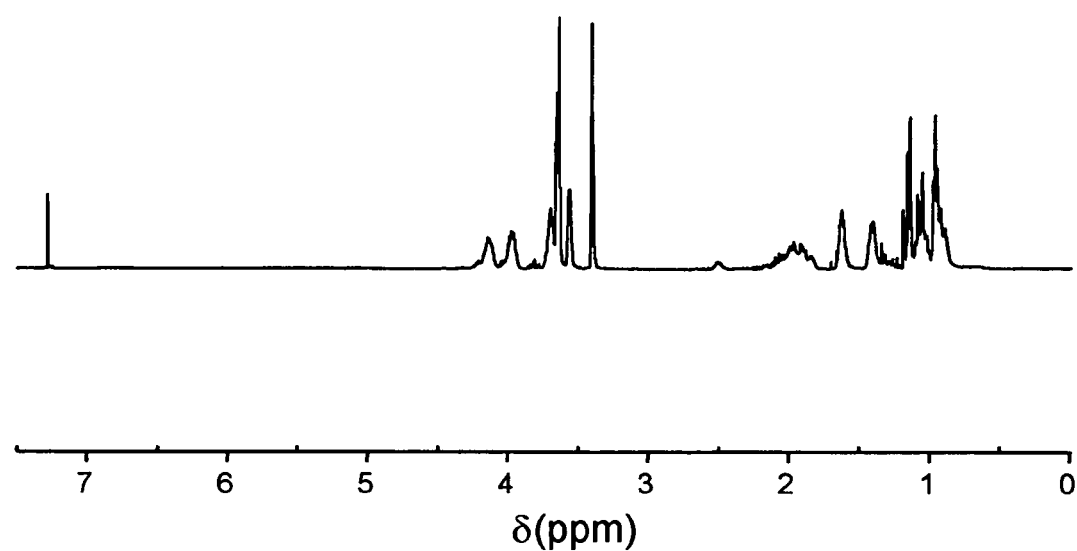
FIG. 2 is the $^1$H-NMR spectrum of a phosphate dispersant synthesized in an example of the present invention.

To a solution of TX-45™ (Sigma-Aldrich Co., USA; Formula 17) (25 mmol) in dry THF (50 mmol), sodium hydride (50 mmol) was slowly added at 25° C. and the solution was stirred over 2 hours. To the stirred mixture, methyl chlorophosphate (50 mmol) was added dropwise at 0° C. over 2 hours, and the mixture was stirred in a nitrogen stream at 25° C. for 12 hours. Then, the reaction mixture was poured into ice water, and the organic layer was isolated and washed successively with aqueous HCl solution and water. The resulting product was then added to a mixture of 3M NaOH aqueous solution (100 ml) and methanol (10 ml). The solution was heated to reflux for 12 hours. The reaction mixture was adjusted to pH 2 with aqueous HCl solution. The organic layer was isolated using methylene chloride, and the solvent was then evaporated to obtain the dispersant of Formula 14 as a yellow viscous oil (84% yield). The 500-MHz $^1$H-NMR spectrum of the phosphate dispersant thus obtained is shown in FIG. 2.

Example 1

Preparation of Metal Oxide Paste Composition

As metal oxide in this Example, 16 g of commercially available nanocrystalline titanium dioxide (nc-$TiO_2$) (Aeroxide® P25, Degussa; 80% anatase and 20% rutile) was used. In order to remove water and volatile organics from the titanium dioxide powder before use, the titanium dioxide was dried in a vacuum at 130° C. for 24 hours. As a solvent, 28.48 g of a 1.8:1 wt/wt mixture of α-terpineol (Kanto Chemical Co., Japan) and butyl carbitol acetate (Kanto Chemical Co., Japan) was used. As an organic binder, 2.4 g ethyl cellulose (ETHOCEL®, standard 45, Dow Chemical Corp, USA) was used. Ethyl cellulose and the mixture of α-terpineol and butyl carbitol acetate were mixed with each other at a weight ratio of 3:5 in a silicone oil bath at 50° C. so as to prepare an ethyl cellulose binder solution. To the prepared ethyl cellulose binder solution, the TiO$_2$ nanoparticles were added, and the dispersant of Formula 9 as synthesized in the above synthesis example was then added. The mixture was milled with yttria-stabilized zirconia balls, thus preparing the metal oxide paste composition.

Examples 2 to 4

Metal oxide paste compositions were prepared in the same manner and using the same amounts and proportions as described in Example 1, except that compounds of Formula 7 (for Example 2), Formula 8 (for Example 3), and Formula 9 (for Example 4) were used as dispersants.

Comparative Example 1

A metal oxide paste composition was prepared in the same manner and using the same amounts and proportions as described in Example 1, except that a dispersant was not used.

Comparative Examples 2 to 4

Metal oxide paste compositions were prepared in the same manner and using the same amounts and proportions as described in Example 1, except that oleic acid (Comparative Example 2), oleyl sarcosine (Comparative Example 3) and an acidic surfactant (KD-15, Uniqema, England) (Comparative Example 4) were used as dispersants.

Test Example 1

Evaluation of Changes in Viscosity of Metal Oxide Paste Compositions

The metal oxide paste compositions prepared in Examples 1 to 4 and Comparative Examples 1-4 were measured for changes in viscosity while increasing shear rates, and the results are shown in FIG. 4. The measurement was performed in a rheometer viscometer (AR2000, Thermal Analysis, USA) using a cone-and-plate viscometer (diameter: 40 mm; angle: 20) at a temperature of 24.5-25.5° C. for 30 seconds.

Referring to FIG. 4, the compositions of Examples 1 to 4 containing the carboxylic ester dispersants showed a clear reduction in viscosity compared to the metal oxide paste compositions of Comparative Examples 1-4. A reduction in viscosity correlates to an increased degree of dispersion of the metal oxide in the metal oxide paste composition, where a less dispersed metal oxide provides a metal oxide paste composition with higher viscosity. Thus, these results show that, in the case of the metal oxide paste composition containing the carboxylic ester dispersants and/or phosphate dispersants disclosed herein, the metal oxide has unexpectedly improved dispersibility. A metal oxide layer prepared from the metal oxide paste composition having a metal oxide with improved dispersibility, has a higher surface area so that it can adsorb an increased amount of a photosensitive dye thereon.

Test Example 2

Figure 5:
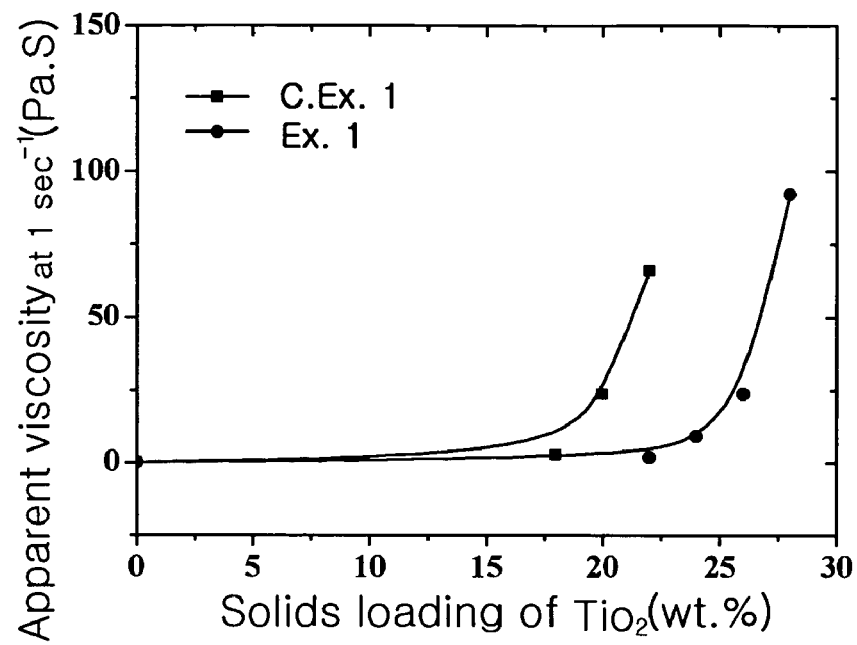
FIG. 5 is a graphic diagram showing the change in viscosity as a function of the amount of metal oxide used in metal oxide paste compositions according to the Examples and Comparative Examples.

Evaluation of Changes in Viscosity of Metal Oxide Paste Compositions, Caused by Amount of Metal Oxide Used A metal oxide paste composition prepared in the same manner as in Example 1 (using 4 wt % of a dispersant) was measured for viscosity while gradually increasing the loading of TiO$_2$ from 0 to 28 wt % therein, and the results are graphically shown in FIG. 5. For comparison, a metal oxide paste composition containing no dispersant (Comparative Example 1) was measured for viscosity in the same manner as above, and the results are shown also in FIG. 5.

Referring to FIG. 5, in the case of the metal oxide paste composition containing the inventive dispersant, the content of TiO$_2$ could be increased up to 26 wt % while maintaining constant viscosity. In the comparison of TiO$_2$ content at the same viscosity of 25 Pa·s between Example 1 and Comparative Example 1, Comparative Example 1 containing no dispersant showed a TiO$_2$ content of 18-20%, whereas Example 1, containing the carboxylic ester dispersant, showed a TiO$_2$ content of 24-26%. This indicates that, in the case of Example 1, the content of TiO$_2$ can be increased by about 6% without increasing the viscosity, compared to the case of Comparative Example 1. This increase in TiO$_2$ content can prevent cracks resulting from pores occurring after a calcination step and can improve the conductivity of the resulting semiconductor electrode.

Example 5

On a glass substrate, fluorine-doped tin oxide (FTO) was applied through sputtering to form a transparent electrode. Then, the nc-TiO$_2$ particle paste prepared in Example 1 was applied on the transparent electrode through a screen printing technique and dried at 70° C. for 30 minutes. After completion of the drying, the resulting substrate was placed in an electric furnace, in which it was heated at a rate of 3° C./min in air and maintained at 450° C. for 30 minutes and then cooled at a rate of 3° C./min, thus forming a porous TiO$_2$ film.

Next, the glass substrate having the metal oxide layer formed thereon was immersed in a solution of 0.3 mM cis-bis(isothiocyanate)bis(2,2'-bipyridyl-4,4'-dicarboxylato)-ruthenium ("N3 dye") in ethanol (3 mM) for 16 hours and then dried, so that the dye was adsorbed on the surface of the TiO$_2$ layer, thus manufacturing a semiconductor electrode.

Meanwhile, platinum was coated on a conductive transparent glass substrate coated with ITO, thus preparing a counter-electrode. While the surface of the semiconductor electrode and the surface of the counter-electrode were placed inside a cell, a SURLYN® film (commercially available from Dupont; 100 μm thickness) was interposed between these two electrodes. The two electrodes were adhered closely to each other on a heating plate at about 120° C. under about 2 atm (0.2 MPa).

Then, the space between the two electrodes was filled with an electrolyte solution, thereby manufacturing a dye-sensitized solar cell. Herein, the electrolyte solution used was an I$_3^-$/I$^-$ electrolyte solution obtained by dissolving 0.6M 1,2-dimethyl-3-octyl-imidazolium iodide, 0.2M LiI, 0.04M I$_2$ and 0.2M 4-tert-butyl-pyridine (TBP) in acetonitrile.

Comparative Example 5

A solar cell was manufactured in the same manner as in Example 5, except that the metal oxide paste composition of Comparative Example 1 containing no dispersant was used.

Examples 6 to 9

Solar cells were manufactured in the same manner as in Example 5, except that nc-TiO$_2$ particle paste compositions, each containing the compound of Formula 13 (Example 6), the compound of Formula 14 (Example 7), the compound of Formula 15 (Example 8) or the compound of Formula 16 (Example 9) as a dispersant were used.

Comparative Example 6

A solar cell was manufactured in the same manner as in Example 6, except that a metal oxide paste composition containing no dispersant was used.

Test Example 3

Measurement of Thicknesses of TiO$_2$ Thin Films and Comparison of Optical Microscope Photographs The TiO$_2$ thin films manufactured in Example 5 and Comparative Example 5 were measured for thickness at three points (left, middle and right) of the semiconductor electrodes using an Alfa-step profiler, and the results are shown in Table 1 below.

Figure 6A:
FIG. 6a is an optical microscope photograph of a titanium dioxide thin film formed from the metal oxide paste composition of Comparative Example 1.

Meanwhile, optical microscope photographs of the TiO$_2$ thin films formed in Example 5 and Comparative Example 5 are shown in FIGS. 6a and 6b, respectively. As shown in FIGS. 6a and 6b, in the case of Comparative Example 5, considerable cohesion between the metal oxide particles was observed, but substantial cohesion was not observed in the case of the TiO$_2$ thin film formed from the inventive metal oxide paste composition.

Test Example 5

Evaluation of Photoelectric Efficiency of Solar Cell Manufactured Using Carboxylic Ester Dispersant The photovoltage and photocurrent of each of the photoelectric conversion elements manufactured in Example 5 and Comparative Example 5 were measured to calculate photoelectric efficiencies. In this case, a Xenon lamp (Oriel, 01193) was used as a light source, and the sunlight condition (AM 1.5) of the Xenon lamp was corrected using a reference solar cell (Furnhofer Institute Solare Engeriessyteme, Certificate No. C-ISE369, Type of material: Mono-Si$^+$ KG filter). Photocurrent density ($I_{sc}$), open voltage ($V_{oc}$) and filler factor (FF), which have been calculated from the above measured photocurrent-voltage curve, were substituted into Equation 1 to calculate photoelectric efficiency ($\eta_e$). The calculation results are shown in Table 1 below.

$$\eta_e(\%) = (V_{oc} \times I_{sc} \times FF)/(P_{inc}) \times 100 \quad \text{[Equation 1]}$$

wherein $P_{inc}$ denotes 100 mW/cm$^2$ (1 sun).

thickness of the TiO$_2$ thin film. Also, in the solar cell comprising the inventive semiconductor electrode, the adsorption of the dye in the semiconductor electrode was increased so as to increase photocurrent density ($I_{sc}$), thus improving the overall light conversion efficiency of the solar cell.

Test Example 6

Evaluation of Photoelectric Efficiency of Solar Cell Manufactured Using Phosphate Dispersant The photoelectric efficiencies of the photoelectric convention elements manufactured in Examples 6 to 9 and Comparative Example 6 were calculated and the results are graphically shown in FIG. 7. As shown in FIG. 7, the solar cells manufactured using the metal oxide paste containing the carboxylate and/or phosphate dispersants disclosed herein showed an increase of about 20% or more in photoelectric efficiency, compared to that ($\eta_e$=2.534%) of Comparative Example 6 containing no dispersant.

Figure 8B:
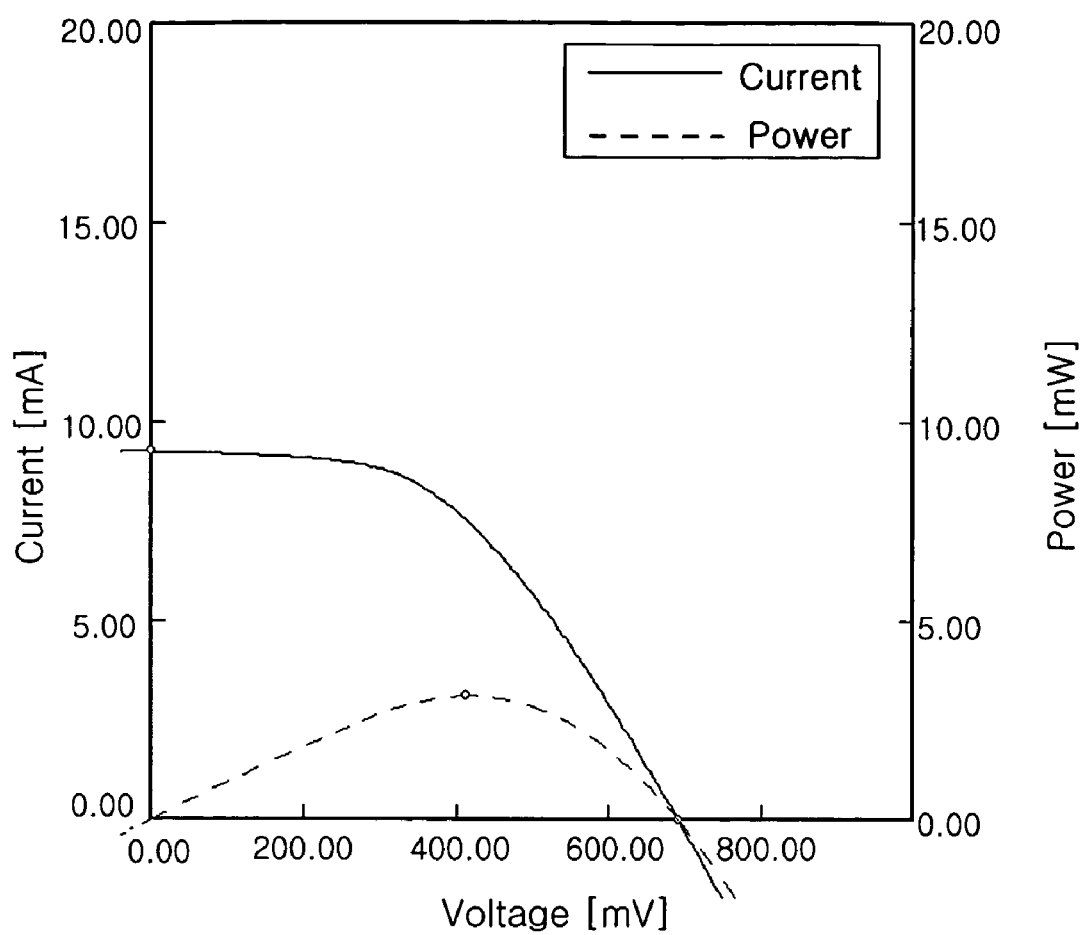
FIG. 8b is a photocurrent-voltage curve for the solar cell manufactured in Example 6.

The photocurrent-voltage curves of the solar cells manufactured in Examples 6 and Comparative Example 5 are shown in FIGS. 8a and 8b, respectively. In the comparison between FIGS. 8a and 8b, the photocurrent-voltage curve of FIG. 8b for the metal oxide paste composition containing the phosphate dispersant more closely resembled an angular shape than did that of FIG. 8a. This indicates that the solar cell manufactured using the metal oxide paste composition having the carboxylate and/or phosphate dispersants has an improved fill factor property, and therefore improved photoelectric efficiency.

As described above, in the metal oxide paste composition containing the carboxylate and/or phosphate dispersants disclosed herein, the dispersibility of the metal oxide is improved so that the use of the metal oxide can be increased without increasing the viscosity of the composition. If the metal oxide paste composition disclosed herein is used to manufacture a semiconductor electrode, it can improve the uniformity of the metal oxide layer of the semiconductor electrode while reducing defects, thus significantly increasing the adsorption of a dye onto the metal oxide. Accordingly, a solar cell that utilizes a semiconductor electrode manufactured according to the present invention takes advantage of improved photoelectric efficiency.

Meanwhile, in manufacturing a semiconductor electrode for flexible solar cells, a pressing process is performed. In this

TABLE 1

| | Thickness | | | | $V_{oc}$ | | Photoelectric efficiency |
|---|---|---|---|---|---|---|---|
| | Left | Middle | Right | $I_{sc}$ (mA) | (mV) | FF | (%) |
| Example 5 | 9.739 | 7.976 | 9.484 | 10.743 | 731.274 | 0.611 | 4.797 |
| Comparative Example 5 | 10.318 | 8.353 | 10.338 | 8.657 | 733.095 | 0.668 | 4.240 |

As can be seen from the results in Table 1, in the case of the semiconductor electrode manufactured using the inventive metal oxide paste composition, variation in the thickness of the TiO$_2$ thin film was somewhat small, but in the case of Comparative Example 5, aggregates between the metal oxide particles were formed to greatly increase variation in the case, a semiconductor electrode manufactured according to the method disclosed herein can also provide the effect of reducing deformation and damage to a film during the pressing process.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A metal oxide paste composition comprising:
   10-40 wt % of a metal oxide, wherein the metal oxide is at least one selected from the group consisting of titanium oxide, niobium oxide, hafnium oxide, tungsten oxide, indium oxide, tin oxide and zinc oxide;
   1-10 wt % of at least one dispersant selected from the group consisting of carboxylic ester dispersants represented by Formula 1; and
   a balance of binder solution consisting of a solvent and an organic binder,
   wherein the amounts of metal oxide, dispersant, and binder solution are based on the total weight of the metal oxide, the dispersant, and the binder solution;
   wherein Formula 1 is as follows:

[Formula 1]

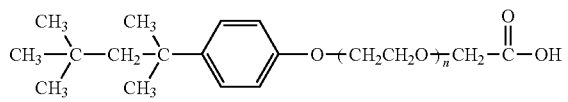

wherein n is 1-20.

2. The metal oxide paste composition of claim 1, wherein the at least one dispersant is Formula 9:

[Formula 9]

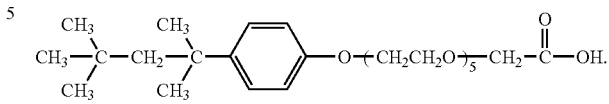

3. The metal oxide paste composition of claim 1, wherein the organic binder is selected from the group consisting of acrylic resin, styrene resin, cellulose resin, methacrylic ester polymer, styrene-acrylic ester copolymer, polyvinylbutyral, polyvinyl alcohol, polyethylene oxide, polypropylene carbonate and polymethyl methacrylate.

4. The metal oxide paste composition of claim 1, wherein the solvent is at least one selected from the group consisting of aromatic hydrocarbon compounds, ether compounds, ketone compounds, ester compounds, and alcohol compounds.

5. The metal oxide paste composition of claim 4, wherein the solvent is at least one selected from the group consisting of toluene, xylene, tetrahydrofuran, 1,2-butoxyethane, acetone, methylethylketone, ethyl acetate, butyl acetate, butyl carbitol acetate (BCA), isopropylalcohol, diethyleneglycol monobutylether, terpineol, and 2-phenoxyethanol.

6. The metal oxide paste composition of claim 1, wherein the metal oxide is a nanosized material selected from the group consisting of quantum dots, nanodots, nanotubes, nanowires, nanobelts and nanoparticles.

* * * * *